United States Patent
Dawkins et al.

(10) Patent No.: US 7,370,240 B2
(45) Date of Patent: May 6, 2008

(54) METHOD AND APPARATUS FOR PRESERVING TRACE DATA IN A LOGICAL PARTITIONED DATA PROCESSING SYSTEM

(75) Inventors: George John Dawkins, Austin, TX (US); Alongkorn Kitamorn, Austin, TX (US); Ashwini Kulkarni, Austin, TX (US); Gordon D. McIntosh, Austin, TX (US); Gary Lee Ruzek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/835,497

(22) Filed: Apr. 29, 2004

(65) Prior Publication Data

US 2005/0257094 A1 Nov. 17, 2005

(51) Int. Cl.
*G06F 11/00* (2006.01)
(52) U.S. Cl. .................................................. 714/45
(58) Field of Classification Search .................... 714/45
See application file for complete search history.

(56) References Cited

U.S. PATENT DOCUMENTS

| | | | |
|---|---|---|---|
| 4,837,767 A | 6/1989 | Hartwell et al. | |
| 5,345,590 A | 9/1994 | Ault et al. | |
| 5,642,478 A * | 6/1997 | Chen et al. | 714/45 |
| 5,805,790 A | 9/1998 | Nota et al. | |
| 6,473,830 B2 | 10/2002 | Li et al. | |
| 6,493,837 B1 * | 12/2002 | Pang et al. | 714/45 |
| 6,658,591 B1 | 12/2003 | Arndt et al. | |
| 6,681,309 B2 | 1/2004 | Szendy et al. | |
| 6,883,116 B2 | 4/2005 | Lee et al. | |
| 6,886,064 B2 | 4/2005 | Dawkins et al. | |
| 6,910,160 B2 * | 6/2005 | Bajoria et al. | 714/45 |
| 2002/0120815 A1 * | 8/2002 | Zahavi et al. | 711/118 |
| 2002/0178404 A1 | 11/2002 | Austen et al. | |
| 2003/0037225 A1 | 2/2003 | Deng et al. | |
| 2003/0056155 A1 | 3/2003 | Austen et al. | |
| 2003/0159086 A1 | 8/2003 | Arndt et al. | |
| 2004/0078735 A1 | 4/2004 | Quach | |
| 2005/0060516 A1 * | 3/2005 | Bottemiller et al. | 712/34 |
| 2005/0268158 A1 | 12/2005 | McIntosh et al. | |
| 2005/0278574 A1 | 12/2005 | Kitamorn et al. | |

* cited by examiner

*Primary Examiner*—Scott Baderman
*Assistant Examiner*—Brian Assessor
(74) *Attorney, Agent, or Firm*—Duke W. Yee; Diana R. Gerhardt; Peter B. Manzo (57) ABSTRACT

A method, apparatus, and computer instructions for preserving trace data in a logical partitioned data processing system. A call is received from a partition in a plurality of partitions to register a buffer in the partition for the trace data. The call includes a pointer to the buffer. The buffer is associated with a trace routine in platform firmware. The trace routine stores the trace data for calls made by the partition to the platform firmware in the buffer.

22 Claims, 4 Drawing Sheets

METHOD AND APPARATUS FOR PRESERVING TRACE DATA IN A LOGICAL PARTITIONED DATA PROCESSING SYSTEM

BACKGROUND OF THE INVENTION

1. Technical Field

The present invention relates generally to an improved data processing system and in particular to a method and apparatus for processing data. Still more particularly, the present invention relates to a method, apparatus, and computer instructions for preserving trace data.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image.

Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

When a logical partitioned data processing system experiences a failure, data relating to processes and system states are needed to help identify and analyze the failure. In current logical partitioned data processing systems, some of the data needed to diagnose a failure is not available because of the current design of the systems. For example, the platform firmware includes a trace facility to allow for tracing of code paths in the firmware. An example of platform firmware used in logical partitioned data processing systems is a hypervisor, which is available from International Business Machines Corporation.

With the currently used trace facilities, trace information showing the code path taken in the platform firmware and critical data values are written into a trace buffer as each partition makes platform firmware calls. This trace information is particularly critical when an error is encountered by a partition and the error path is traced along with critical data values.

This situation creates a problem with large configurations where processors are dedicated to multiple partitions in which these partitions write to the same buffer. These buffers are typically organized in a circular fashion. Thus, if a partition crash occurs, the trace data may be quickly overwritten by other partitions in the logical partitioned data processing system. As a result, critical data, required to help in the diagnosis of the problem, may be lost.

One solution is to create a larger buffer. Further, as the number of partitions increase, the size of this trace buffer is required to grow to accommodate additional partitions. The buffer structure must be preallocated with the largest configuration in mind because each logical partitioned data processing system is configured individually and dynamic configuration is allowed. As a result, wasted memory space is present for smaller configurations. Further, in systems in which system memory is a premium price, the wasted space increases the cost of the logical partitioned data processing system.

Therefore, it would be advantageous to have an improved method, apparatus, and computer instructions for preserving trace data.

SUMMARY OF THE INVENTION

The present invention provides a method, apparatus, and computer instructions for preserving trace data in a logical partitioned data processing system. A call is received from a partition in a plurality of partitions to register a buffer in the partition for the trace data. The call includes a pointer to the buffer. The buffer is associated with a trace routine in platform firmware. The trace routine stores the trace data for calls made by the partition to the platform firmware in the buffer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
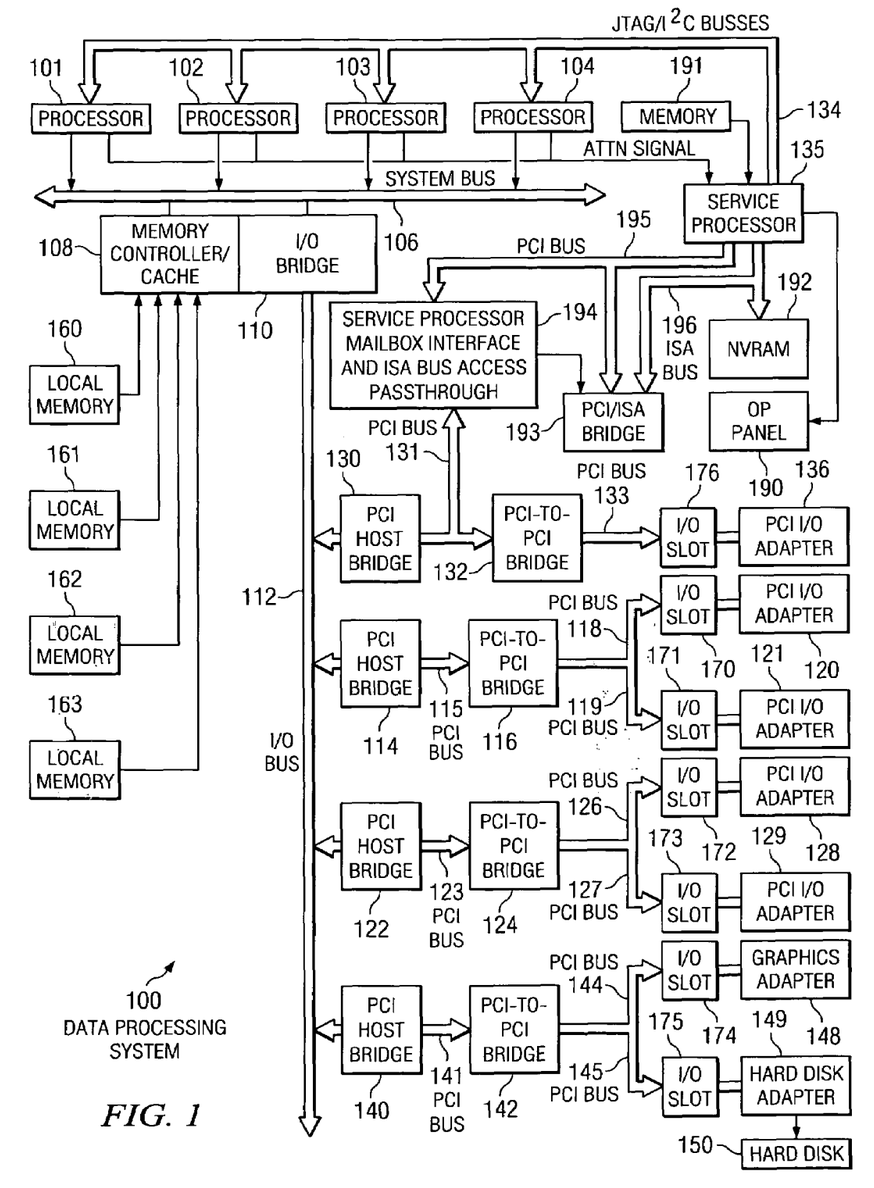
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121, provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service, processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
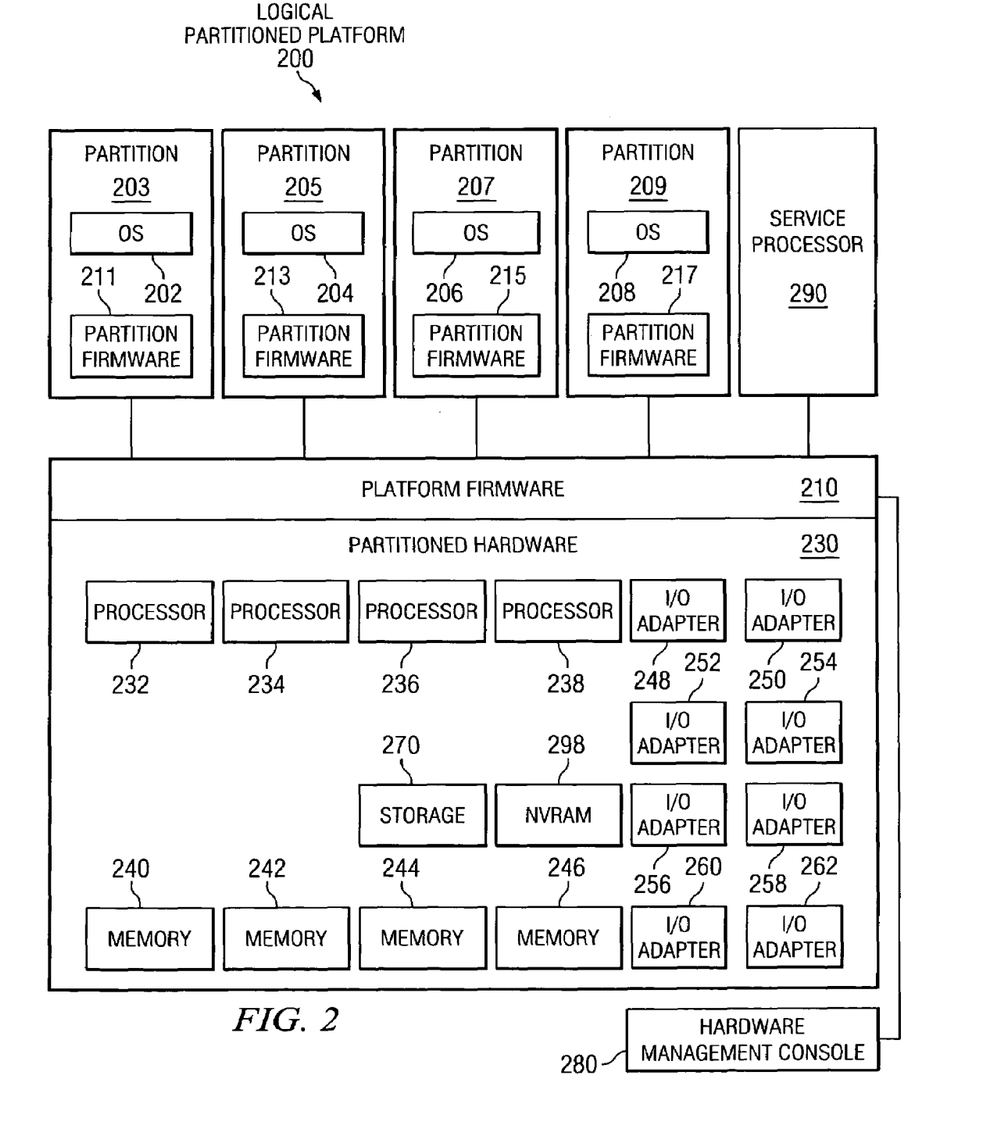
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present invention provides an improved method, apparatus, and computer instructions for preserving partition specific trace data in a logical partitioned data processing system. This feature is provided through relocating trace buffers to partition address space in the illustrative examples. The mechanism of the present invention recognizes that the operating system is allowed to register a machine check interrupt handler during the loading stage of the operating system. Additionally, a pointer to a 1KB buffer is supplied to the platform firmware. That buffer is used to return errors.

The mechanism of the present invention adds an additional registration feature for use by an operating system during loading of the operating system. The mechanism of the present invention allows the operating system in the partition to pass an additional pointer to the platform firmware at registration time, while the operating system is loading. In these illustrative examples, this additional pointer is a pointer to a buffer for use in storing trace data. This buffer is located in the partition memory. Additionally, a size of the buffer may be passed to the platform firmware. This size is typically a length value.

In this manner, each partition may create a trace buffer for use in storing trace data that is directly related to a particular partition. As a result, if a partition crashes, the information in the trace buffer for that partition is not overwritten by other partitions.

Figure 3:
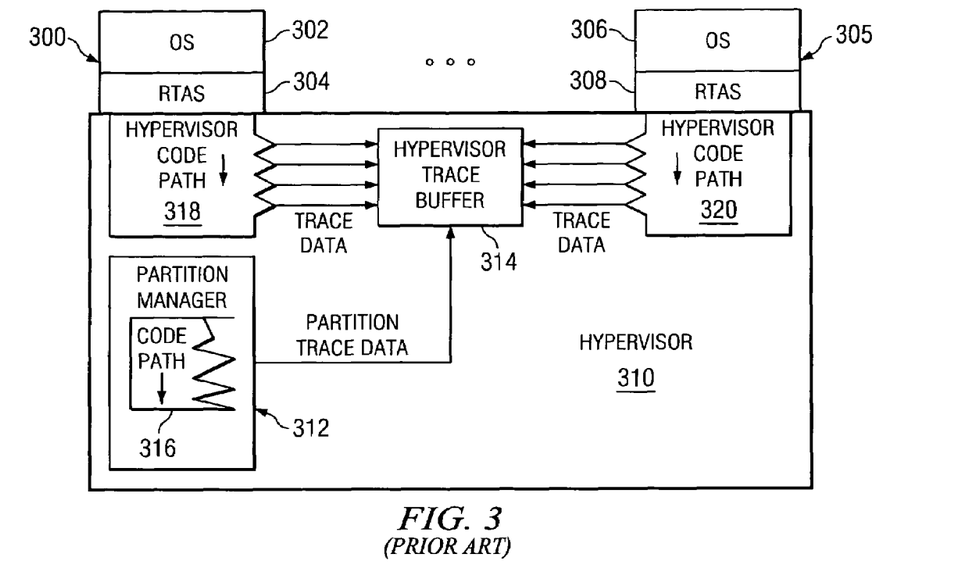
FIG. 3 is a diagram showing a known configuration of components currently used to save platform firmware trace data.

With reference now to FIG. 3, a diagram showing a known configuration of components currently used to save platform firmware trace data is depicted. In this illustrative example, partition 300 contains operating system 302 and RTAS 304. Partition 305 contains operating system 306 and RTAS 308. In these depicted embodiments, up to 255 partitions may be present. All of these partitions are managed through platform firmware, such as hypervisor 310.

Partition manager 312 writes trace information into hypervisor trace buffer 314 as code path 316. This trace information is written as this component makes calls to hypervisor 310. Partition manager 312 is a component within hypervisor 310. This component is used to manage the partitions and includes functions, such as starting and terminating partitions. The calls made by partition manager 312 are stored within hypervisor trace buffer 314.

In a similar fashion, as calls are made by partition 300 to hypervisor 310, hypervisor code path 318 is formed with the trace data for these calls being stored in hypervisor trace buffer 314. In a similar fashion, hypervisor code path 320 is formed as calls are received by hypervisor 310 from partition 305. The trace data for this path also is stored in hypervisor trace buffer 314.

This current implementation is simple and only requires a single static buffer in the memory space for the platform firmware. The disadvantage of this implementation is that hypervisor trace buffer 314 must be large enough to handle the maximum number of partitions envisioned for the logical partitioned data processing system. As a result, smaller configurations waste memory space.

Further, trace data from all of the partitions are written to this buffer. As a result, security issues may occur in which any partition may analyze all operations that occur on all other partitions as well as hypervisor partition manager operations. Additionally, partitions that crash cannot easily preserve critical trace data because with the circular implementation with these types of buffers, critical data is quickly lost through overwriting.

Figure 4:
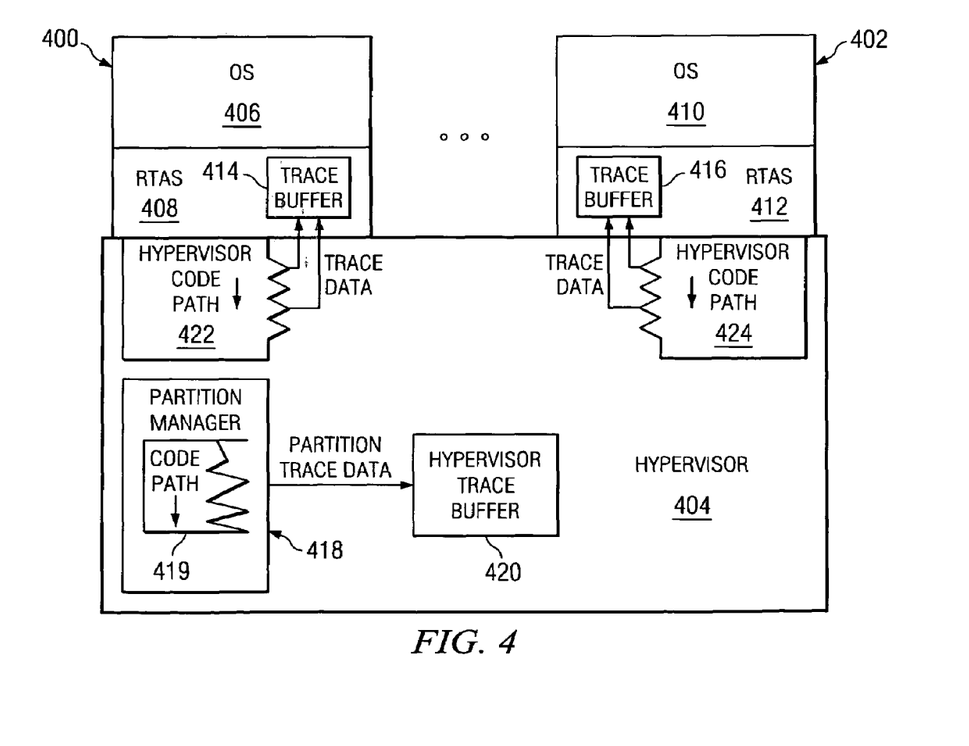
FIG. 4 is a diagram of a configuration for preserving trace data in accordance with a preferred embodiment of the present invention.

Turning now to FIG. 4, a diagram of a configuration for preserving trace data is depicted in accordance with a preferred embodiment of the present invention. In this illustrative example, partition 400 and partition 402 are present and managed through hypervisor 404. Partition 400 contains operating system 406 and RTAS 408, while partition 402 contains operating system 410 and RTAS 412. In this example, partition 400 also includes trace buffer 414 and partition 402 contains trace buffer 416. Each of these trace buffers are located in memory space for a partition, rather than memory space for hypervisor 404.

Partition manager 418 also is present within hypervisor 404. As calls are executed partition code path 419 occurs. The trace data for this code path is stored within hypervisor trace buffer 420. Only the code path for partition manager 418 is stored in hypervisor trace buffer 420 in these illustrative examples. The additional trace buffers for each of the partitions are allocated during registration of the operating systems in these illustrative examples.

As a result, hypervisor code path 422 occurs in response to calls made by partition 400 to hypervisor 404, the trace data is written into trace buffer 414. In a similar fashion, trace data for hypervisor code path 424 is written into trace buffer 416 in response to calls generated by partition 402 to hypervisor 404. In these illustrative examples, up to 255 partitions may be present. Each of these partitions includes a trace buffer, which is allocated during registration of the operating system in these illustrative examples.

This mechanism includes a modification of the registration call made by the partitions and the modification of how the hypervisor handles such a call. The current registration call presently available in systems is as follows: ibm,nmi-registe(token, NumberInput, NumberOutputs, pReset, Status). This call is currently used to register a machine check interrupt handler. This call includes the following parameters: Token, Number of Inputs (2), Number of Outputs (1), the operating system's System reset entry point, the operating system's machine check entry point, and status.

This existing call is extended by the addition of two parameters, a pointer to a buffer for trace data and the buffer length in accordance with a preferred embodiment. The platform firmware is modified to recognize and handle the pointers and size information. In these illustrative examples, the buffer length is used as a separate parameter rather than forcing a fixed length buffer to allow flexibility of design for the different types of supported operating systems, such as, for example, AIX, Linux, and OS400. Additionally, no specific restrictions are placed on this buffer in these examples except for the buffer may not be written by the operating system. Of course, depending on the implementation, a new call may be used rather than modifying an existing call.

During the registration process, when the hypervisor receives the registration call in which the additional parameters of the present invention are included, the logical address is converted to a physical address. This physical address and the size of the buffer are passed to a hypervisor trace routine. This trace routine then uses the buffer supplied by the partition for all subsequent trace data for the partition. If no registration call is made, the trace data is maintained in the trace buffer currently supplied by the hypervisor.

Figure 5:
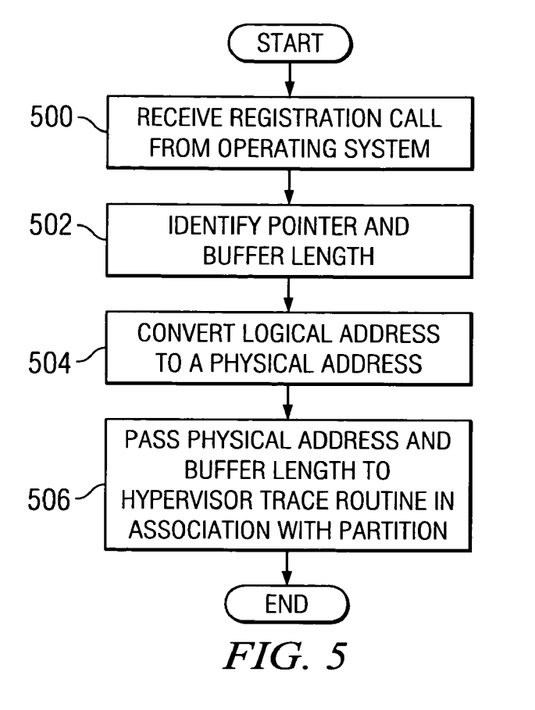
FIG. 5 is a flowchart of a process for registering a trace buffer with platform firmware in accordance with a preferred embodiment of the present invention.

With reference now to FIG. 5, a flowchart of a process for registering a trace buffer with platform firmware is depicted in accordance with a preferred embodiment of the present invention. The process illustrated in FIG. 5 may be implemented in platform firmware, such as hypervisor 404 in FIG. 4.

The process begins by receiving a registration call from an operating system (step 500). This call includes a pointer to a buffer in the partition making the call and a size of the buffer. The size of the buffer is optional, but provides flexibility to allow different partitions to use different buffer sizes. The buffer size is passed as a length parameter in the illustrative examples.

Next, the pointer and buffer length passed in the call are identified (step 502). Then, the logical address is converted to a physical address (step 504). Next, the physical address and buffer length are passed to a hypervisor trace routine in association with a partition (step 506) with the process terminating thereafter. The information is used by the trace routine in the platform firmware to store trace data for the partition in the buffer passed by the partition in the call.

Figure 6:
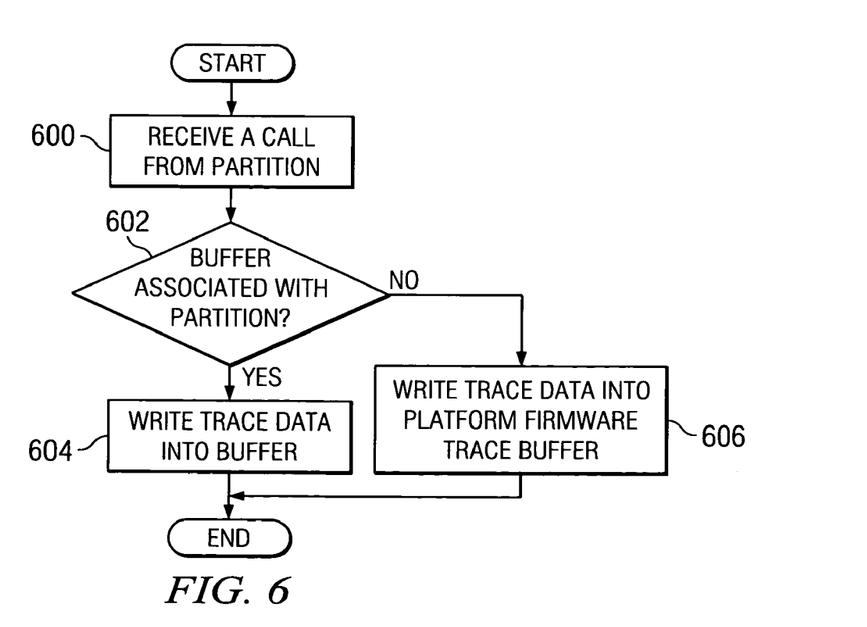
FIG. 6 is a flowchart of a process for storing trace data in accordance with a preferred embodiment of the present invention.

With reference now to FIG. 6, a flowchart of a process for storing trace data is depicted in accordance with a preferred embodiment of the present invention. The process illustrated in FIG. 6 may be implemented in platform firmware, such as hypervisor 400 in FIG. 4.

The process begins by receiving a call from a partition for a platform firmware function (step 600). Next, a determination is made as to whether a buffer is associated with the partition (step 602). If a buffer is associated with the partition, then trace data is written into the buffer (step 604) with the process terminating thereafter.

Referring back to step 602, if a buffer is not associated with the partition, then trace data is written into a platform firmware trace buffer (step 606) with the process terminating thereafter.

Thus, the present invention provides a method, apparatus, and computer instructions for preserving partition specific trace data by relocating trace buffers from the memory space for the platform firmware to the memory space for the partitions. This mechanism provides increased flexibility to the operating system, in terms of preserving the data required for analysis in the event of a partition crash. This flexibility is provided in these illustrative examples by allowing the operating system to set the buffer size. Further, the mechanism of the present invention uses memory allocated in partition space such that memory is not allocated until needed. Further, each partition has control over the data kept and only data from the partition is written into the partition space.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for preserving trace data, the method comprising:
   receiving a call from a calling partition in a plurality of partitions to register a buffer in the calling partition for the trace data, wherein the call includes a pointer to the buffer;
   associating the buffer with a trace routine in platform firmware, wherein the trace routine stores the trace data for calls made from the calling partition to the platform firmware in the buffer;
   responsive to receiving the call from the calling partition in the plurality of partitions, determining whether a registered buffer is present for the calling partition;
   if the registered buffer is present, storing the trace data for the call in the registered buffer; and
   if the registered buffer is absent, storing the trace data for the call in a platform firmware trace buffer.

2. The method of claim 1, wherein the call includes a buffer size for the buffer, and wherein the buffer size is flexible to allow different partitions to use different buffer sizes.

3. The method of claim 1, wherein the call from the partition is generated by an operating system in the partition.

4. The method of claim 1, wherein the receiving step and the associating step are performed by the platform firmware.

5. The method of claim 1, wherein the pointer contains a physical address to the buffer, a size of the buffer and wherein the associating step includes:
   translating the physical address into a logical address; and
   passing the logical address and the size of the buffer to a platform firmware trace routine for use in storing trace data for the partition.

6. The method of claim 1, wherein all partitions in the plurality of partitions register buffers.

7. The method of claim 1, wherein the trace data for calls made by each partition is stored only in an associated registered buffer for that partition in the plurality of partitions.

8. A data processing system in a logical partitioned data processing system for preserving trace data, the data processing system comprising:
   receiving means for receiving a call from a calling partition in a plurality of partitions to register a buffer in the calling partition for the trace data, wherein the call includes a pointer to the buffer;
   associating means for associating the buffer with a trace routine in platform firmware, wherein the trace routine stores the trace data for calls made from the calling partition to the platform firmware in the buffer;
   determining means, responsive to receiving the call from the calling partition in the plurality of partitions, for determining whether a registered buffer is present for the calling partition;
   first storing means, if the registered buffer is present, for storing the trace data for the call in the registered buffer; and
   second storing means, if the registered buffer is absent, for storing the trace data for the call in a platform firmware trace buffer.

9. The data processing system of claim 8, wherein the call includes a buffer size for the buffer, and wherein the buffer size is flexible to allow different partitions to use different buffer sizes.

10. The data processing system of claim 8, wherein the call from the partition is generated by an operating system in the partition.

11. The data processing system of claim 8, wherein the receiving means and the associating means are performed by the platform firmware.

12. The data processing system of claim 8, wherein the pointer contains a physical address to the buffer, a size of the buffer and wherein the associating means includes:
   translating means for translating the physical address into a logical address; and
   passing means for passing the logical address and the size of the buffer to a platform firmware trace routine for use in storing trace data for the partition.

13. The data processing system of claim 8, wherein all partitions in the plurality of partitions register buffers.

14. The data processing system of claim 8, wherein trace data for calls made by each partition is stored only in an associated registered buffer for that partition in the plurality of partitions.

15. A computer program product in a computer recordable-type medium in a logical partitioned data processing system for preserving trace data, the computer program product comprising:

first instructions for receiving a call from a calling partition in a plurality of partitions to register a buffer in the calling partition for the trace data, wherein the call includes a pointer to the buffer;

second instructions for associating the buffer with a trace routine in platform firmware, wherein the trace routine stores the trace data for calls made from the calling partition to the platform firmware in the buffer;

third instructions, responsive to receiving the call from the calling partition in the plurality of partitions, for determining whether a registered buffer is present for the calling partition;

fourth instructions, if the registered buffer is present, for storing the trace data for the call in the registered buffer; and fifth instructions, if the registered buffer is absent, for storing the trace data for the call in a platform firmware trace buffer.

16. The computer program product of claim 15, wherein the call includes a buffer size for the buffer, and wherein the buffer size is flexible to allow different partitions to use different buffer sizes.

17. The computer program product of claim 15, wherein the call from the partition is generated by an operating system in the partition.

18. The computer program product of claim 15, wherein the first instructions and the second instructions are performed by the platform firmware.

19. The computer program product of claim 15, wherein the pointer contains a physical address to the buffer, a size of the buffer and wherein the second instructions includes:

first sub-instructions for translating the physical address into a logical address; and second sub-instructions for passing the logical address and the size of the buffer to a platform firmware trace routine for use in storing trace data for the partition.

20. The computer program product of claim 15, wherein all partitions in the plurality of partitions register buffers.

21. The computer program product of claim 15, wherein the trace data for calls made by each partition is stored only in an associated registered buffer for that partition in the plurality of partitions.

22. A data processing system comprising:

a bus system;

a memory connected to the bus system, wherein the memory includes a set of instructions; and a processing unit connected to the bus system, wherein the processing unit executes the set of instructions to receive a call from a calling partition in a plurality of partitions to register a buffer in the calling partition for trace data, wherein the call includes a pointer to the buffer; associate the buffer with a trace routine in platform firmware, wherein the trace routine stores the trace data for calls made from the calling partition to the platform firmware in the buffer; determine whether a registered buffer is present for the calling partition in response to receiving the call from the calling partition in the plurality of partitions; store the trace data for the call in the registered buffer if the registered buffer is present; and store the trace data for the call in a platform firmware trace buffer if the registered buffer is absent.

* * * * *